US007987750B2

(12) United States Patent
Huang

(10) Patent No.: US 7,987,750 B2
(45) Date of Patent: Aug. 2, 2011

(54) CUTTER STRUCTURE OF LABELING MACHINE

(76) Inventor: Fu-Chuan Huang, Chiayi County (TW)

( * ) Notice: Subject to any disclaimer, the term of this patent is extended or adjusted under 35 U.S.C. 154(b) by 336 days.

(21) Appl. No.: 12/406,120

(22) Filed: Mar. 18, 2009

(65) Prior Publication Data

US 2010/0236366 A1 Sep. 23, 2010

(51) Int. Cl.
*B23B 3/04* (2006.01)
*B23B 5/14* (2006.01)

(52) U.S. Cl. .............................................. 82/101; 82/46

(58) Field of Classification Search ................ 82/46, 83, 82/101, 92, 93, 70.1, 70.2, 54
See application file for complete search history.

(56) References Cited

U.S. PATENT DOCUMENTS 4,072,073 A * 2/1978 Birkestrand ...................... 82/92
5,170,684 A * 12/1992 Lofstrom ....................... 82/70.1
5,458,031 A * 10/1995 Wolff ................................ 82/92
6,742,423 B1 * 6/2004 Huang ............................ 82/101
6,920,812 B2 * 7/2005 Jackson et al. ................. 82/70.2
6,981,437 B2 * 1/2006 Ogawa ........................... 82/70.2
7,398,716 B2 * 7/2008 Quigley ............................ 82/47

* cited by examiner

*Primary Examiner* — Will Fridie, Jr.
(74) *Attorney, Agent, or Firm* — Muncy, Geissler, Olds & Lowe, PLLC

(57) ABSTRACT

The present invention discloses a cutter structure of a labeling machine, wherein a transmission belt driven by a power source is utilized to drive a ring-shaped gear, which is concentric with a through hole and supported by a bearing, and through the inner teeth on the inner surface of the ring-shaped gear engaging with the gears mounted on the top ends of the tool posts, which are disposed along the outer edge of the through hole, the tool posts can be driven by the ring-shaped gear to turn, and at the same time cut the thermal shrinkable film in the through hole, thereby forming a cutter structure with uniform transmission force and high speed and stable cutting process.

2 Claims, 4 Drawing Sheets

CUTTER STRUCTURE OF LABELING MACHINE

FIELD OF THE INVENTION

The present invention is related to a cutter structure of a labeling machine, and more particularly to a cutter whose structure is simple and which can provide stable and high speed cutting.

BACKGROUND OF THE INVENTION

Please refer to FIG. 1 which shows the conventional cutter structure 1 of the labeling machine. The large-sized ring body 12 connected to eccentric wheels 131 above each tool post 13 is used as the linking operation device to control the turning of the tool posts 13.

The control details thereof are described below. The power source drives the gear 110 of the main tool post 11 by a belt 14, the eccentric wheel 111 above the main tool post 11 drives the large-sized ring body 12, and then the large-sized ring body 12 drives the eccentric wheels 131 of plural tool posts 13 to turn all tool posts 13, so as to simultaneously cut the thermal shrinkable film.

However, the conventional cutter structure 1 of the labeling machine has some disadvantages as follows:

1. After long-term pulling by the belt, the bearing of the main tool post is easily to be worn, so as to cause the axle direction of the main tool post to shift and the main tool post to become loose, so that as operating, the main tool post might have vibration which influences the cutting precision.

2. When exchanging the belt, the large-sized ring body has to be removed first, and after exchanging, the ring body is re-assembled again, so that not only the ring body has to aim at each eccentric wheel, the position of each eccentric wheel also has to be adjusted. Therefore, both time and labor are wasted.

3. As using the large-sized ring body to drive the eccentric wheels, the axles of plural tool posts are turned at the same time, which might produce louder noises.

SUMMARY OF THE INVENTION

The object of the present invention is to improve the cutter structure of the labeling machine, for solving the problems of the vibration of the main tool post and the uneasy procedure as exchanging the belt, and also reducing the operation noises.

For achieving the object described above, the present invention provides a cutter structure of a labeling machine, wherein a transmission belt is utilized to drive a ring-shaped gear, which is supported by a bearing, and through the inner teeth on the inner surface of the ring-shaped gear engaging with the gears mounted on the top ends of each tool post, the tool posts can be driven at the same time and all tool posts are suffering uniform force, so that the tool posts can turn stably and smoothly, thereby keeping the cutting precision and speed.

The present invention is also advantageous of convenient maintaining. The structure provided by the present invention is simple and all components are only connected by transmission relationship, so that the operation can be easily maintained by adding lubricant such as grease. Moreover, the design of the present invention prevents the assembling conflict among exchangeable components, and thus, no matter the tool posts and the ring-shaped gear which are directly mounted on the base or the belt set which is sleeved around the outer edge of the ring-shaped gear, all can be exchanged and maintained without disassembling other components.

The cutter structure of a labeling machine according to the present invention has advantages as follows:

1. The tool posts which are driven by the ring-shaped gear have identical components and can be conveniently assembled and maintained.

2. Since the tool posts are driven by the ring-shaped gear synchronously, the bearing will not be worn easily, so that the vibration of tool posts can be reduced and the cutting precision can be improved.

3. The components, such as tool posts, ring-shaped gear and belt set, are respectively independent, thereby facilitating exchanging and maintaining.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DESCRIPTION OF THE PREFERRED EMBODIMENT

Figure 1:
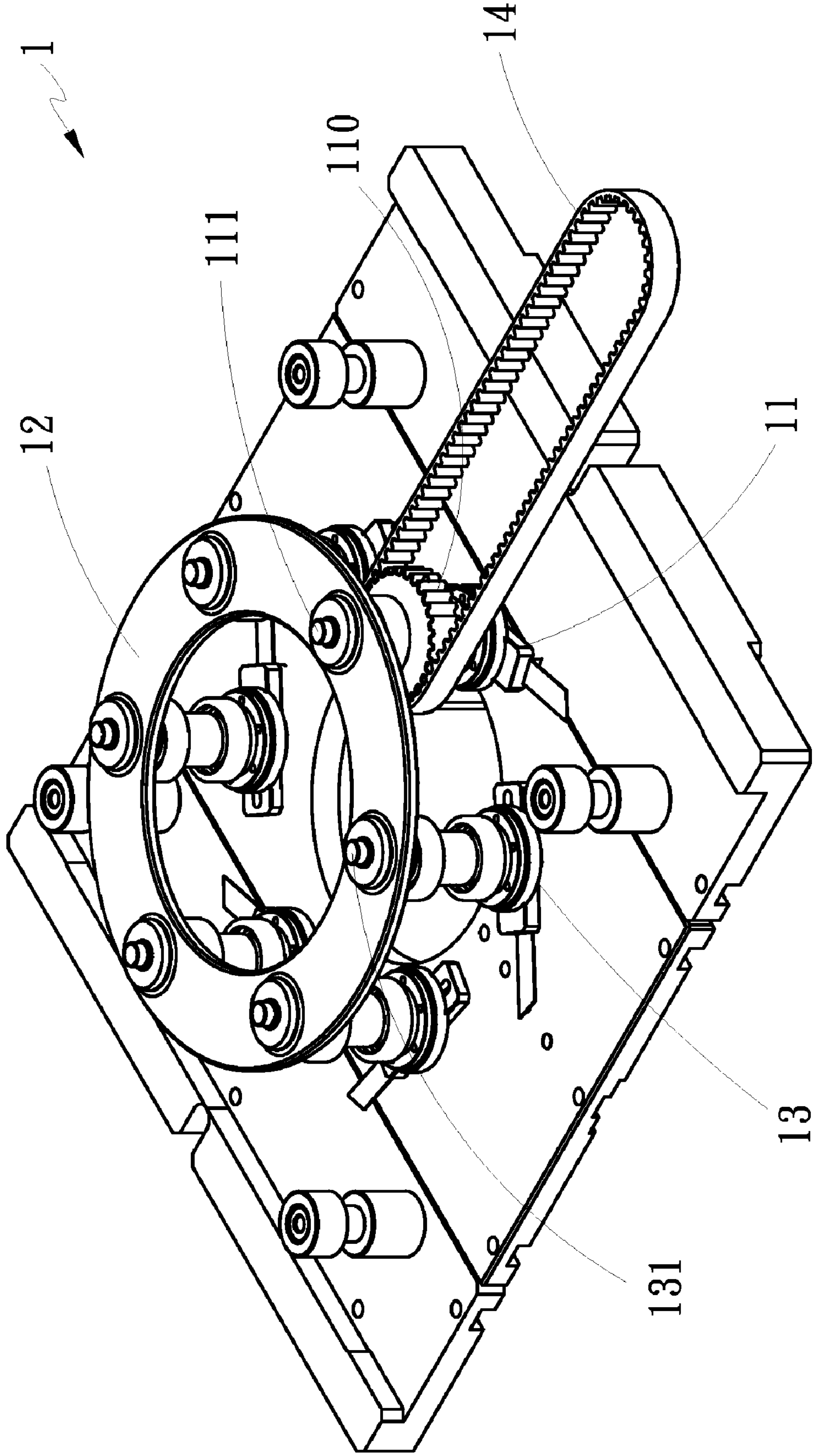
Fig. 1 PRIOR ART
FIG. 1 is a three dimensional drawing showing the conventional cutter structure of the labeling machine.
Figure 2:
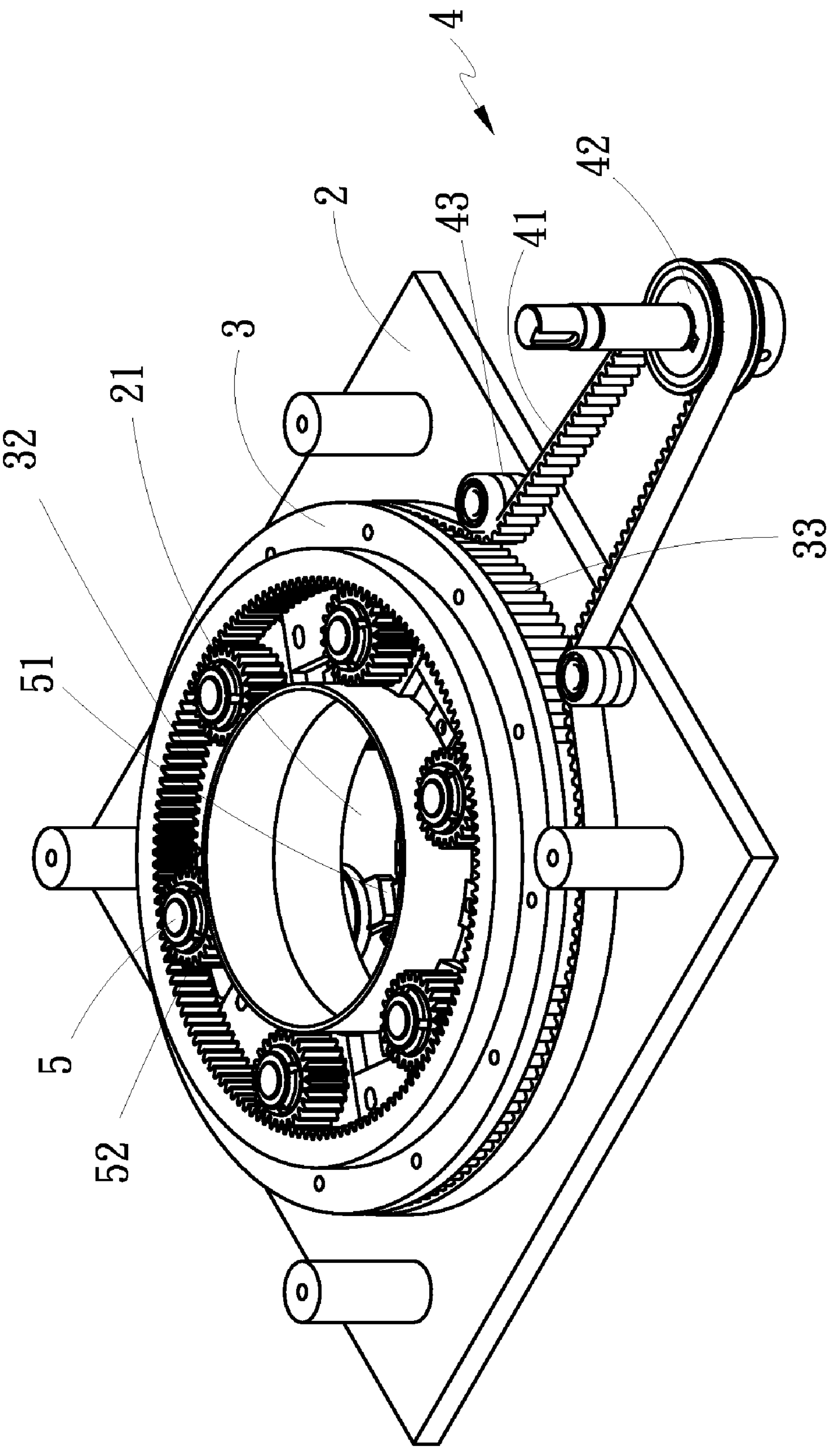
FIG. 2 is a three dimensional drawing of the present invention.
Figure 3:
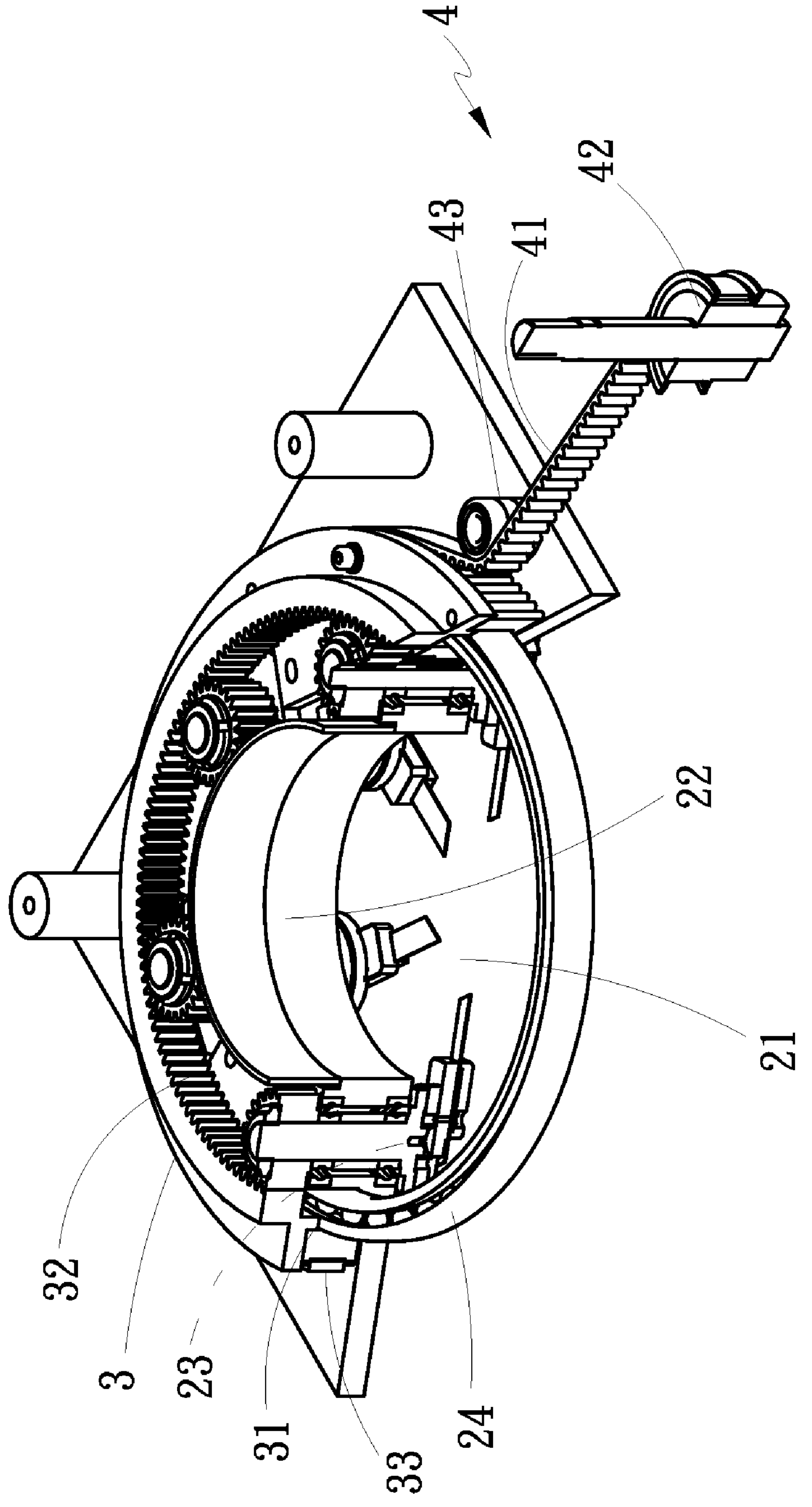
FIG. 3 is a three dimensional sectional drawing of the present invention.

Please refer to FIG. 2 and FIG. 3. The cutter structure of the labeling machine according to the present invention includes a base 2, a ring-shaped gear 3, a belt set 4 and plural tool posts 5, wherein:

The base 2 has a through hole 21 mounted thereon for passing through the thermal shrinkable film, a dust-proof wall 22 vertically mounted around the edge of the through hole 21, plural tool post holes 23 disposed along the outer edge of the through hole 21 so as to form a ring-shaped arrangement, and a bearing 24 mounted at the outer side of the tool post holes 23 and being concentric with the through hole 21.

The ring-shaped gear 3 is mounted above the base 2 and supported by a supporting seat 31 therebelow to locate above the bearing 24 of the base 2, wherein the inner surface of the ring-shaped gear 3 has inner teeth 32 mounted thereon and the outer surface has outer teeth 33 mounted thereon, and the ring-shaped gear 3 is concentric with the through hole 21 of the base 2 and has the size corresponding to the bearing 24.

The belt set 4 is sleeved on and connected with the ring-shaped gear 3 and includes a transmission belt 41, a transmission gear 42 and a set of pushing wheels 43, wherein the transmission belt 41 is a circle with teeth mounted on the inner surface thereof, one side of the transmission belt 41 is engaging with the outer teeth 33 of the ring-shaped gear 3 and the other side of the transmission belt 41 is sleeved on the transmission gear 42 which is connected to the power source, and a set of pushing wheels 43 are located at one side of the base 2 close to the ring-shaped gear 3 for forcing the transmission belt 41 to stay close to the outer teeth 33 of the ring-shaped gear 3, so as to avoid the transmission belt 41 from departing from the outer teeth 33.

The plural tool posts 5 are rotatably mounted in the tool post holes 23 of the base 2, the lower ends of the tool posts 5 penetrate out of the base 2 to respectively connect with blades 51, and the upper ends of the tool posts 5 respectively have gears 52 fixedly mounted thereon for engaging with the inner teeth 32 of the ring-shaped gear 3.

Figure 4:
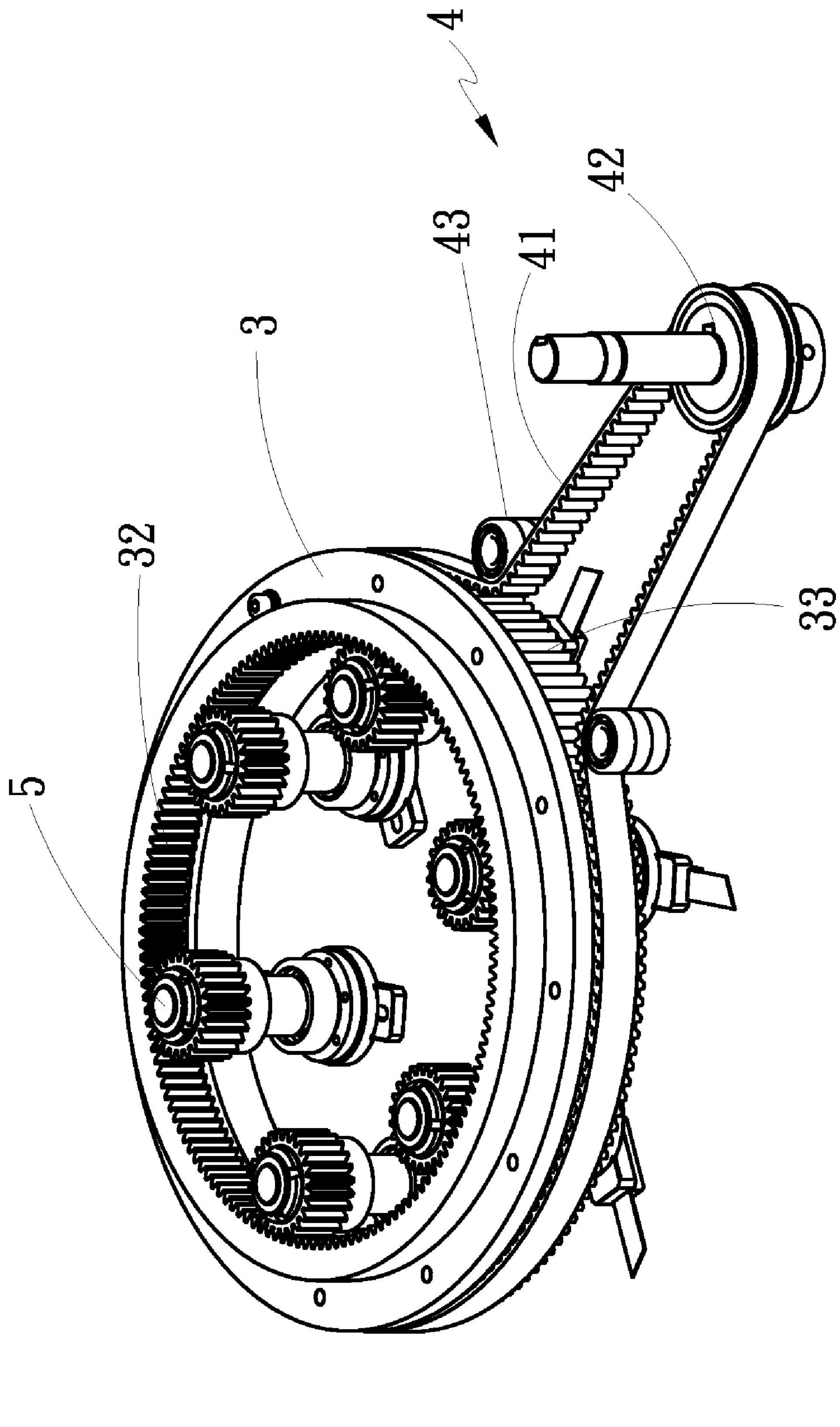
FIG. 4 is a three dimensional drawing showing the connection of tool posts according to the present invention.

Please refer to FIG. 4. According to the present invention, as operating, by driving the transmission gear 42, the power source can drive the transmission belt 41 to drive the ring-shaped gear 3 to turn, through the pushing wheels 43 located at two ends of one side of the ring-shaped gear 3, the transmission belt 41 can be tightly close to the outer teeth 33 of the ring-shaped gear 3, and by the inner teeth 32, the ring-shaped gear 3 can drive the tool posts 5 engaged therewith to turn at the same time, so as to cut the thermal shrinkable film.

As exchanging components, such as the worn transmission belt 41, it only needs to open the case and exchange the transmission belt 41 directly without disassembling other components, especially the components which are corrected for high precision operation, such as tool posts 5, so as to save time and labor in maintaining.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A cutter structure of a labeling machine, comprising a base, a ring-shaped gear, a belt set and plural tool posts, wherein:

the base has a through hole mounted thereon for passing through a thermal shrinkable film, a dust-proof wall vertically mounted around the edge of the through hole, plural tool post holes disposed along the outer edge of the through hole so as to form a ring-shaped arrangement, and a bearing mounted at the outer side of the tool post holes of the base;

the ring-shaped gear is mounted above the base and supported by a supporting seat therebelow to locate above the bearing of the base, wherein the inner surface of the ring-shaped gear has inner teeth mounted thereon and the outer surface has outer teeth mounted thereon;

the belt set is sleeved on and connected with the ring-shaped gear and includes a transmission belt, a transmission gear and a set of pushing wheels, wherein the transmission belt is a circle with teeth mounted on the inner surface thereof, one side of the transmission belt is engaging with the outer teeth of the ring-shaped gear and the other side of the transmission belt is sleeved on the transmission gear, which is connected to the power source, and a set of pushing wheels are located at one side of the base close to the outer side of the ring-shaped gear for forcing the transmission belt to stay close to the outer side of the ring-shaped gear, so as to avoid the transmission belt from departing; and a plural tool posts are rotatably mounted in the tool post holes of the base, wherein the lower ends of the tool posts penetrate out of the base to respectively connect with blades, and the upper ends of the tool posts respectively have gears fixedly mounted thereon for engaging with the inner teeth of the ring-shaped gear.

2. The cutter structure as claimed in claim 1, wherein the central location of the bearing of the base is concentric with the through hole.

* * * * *